United States Patent [19]

Watanabe et al.

[11] Patent Number: 4,816,539

[45] Date of Patent: Mar. 28, 1989

[54] PROCESS FOR PRODUCING VINYL CHLORIDE COPOLYMER

[75] Inventors: Junich Watanabe, Ageo; Tohru Yokota, Ibaraki, both of Japan

[73] Assignee: Shin-Etsu Chemical Co., Ltd., Tokyo, Japan

[21] Appl. No.: 133,502

[22] Filed: Dec. 16, 1987

[30] Foreign Application Priority Data

Dec. 17, 1986 [JP] Japan .................................. 61-301048

[51] Int. Cl.$^4$ .............................................. C08F 18/00
[52] U.S. Cl. .................................... 526/320; 526/200; 526/199; 526/202; 526/203; 526/219.5; 526/230; 526/232; 526/227
[58] Field of Search ............... 526/273, 320, 200, 199, 526/202, 203, 219.5, 230, 232, 227

[56] References Cited

U.S. PATENT DOCUMENTS

| | | | |
|---|---|---|---|
| 3,640,910 | 2/1972 | Porret et al. | 526/273 |
| 4,012,559 | 3/1977 | Fujioka et al. | 524/297 |
| 4,104,457 | 8/1978 | Debord et al. | 526/273 |
| 4,621,044 | 11/1986 | Fujikawa | 430/281 |

FOREIGN PATENT DOCUMENTS

| | | | |
|---|---|---|---|
| 0190653 | 8/1986 | European Pat. Off. | 526/273 |
| 2558188 | 7/1976 | Fed. Rep. of Germany | 526/273 |
| 46-16588 | 5/1971 | Japan | 526/273 |
| 54-133542 | 10/1979 | Japan | 526/273 |
| 1419634 | 12/1975 | United Kingdom | 526/273 |

*Primary Examiner*—Joseph L. Schofer
*Assistant Examiner*—N. Sarofim
*Attorney, Agent, or Firm*—Jules E. Goldberg

[57] ABSTRACT

A vinyl chloride copolymer is produced by copolymerizing vinyl chloride monomer or a monomer mixture comoposed of vinyl chloride monomer and copolymerizable monomer, with one or more than one kind of cross-linking agent selected from polyhydric alcohol diglycidyl ether diacrylate and dimethacrylate. The vinyl chloride copolymer has good moldability and can be made into moldings having good matte finish surface and also good permanent compression set resistance, creep resistance, heat resistance, and electrical properties.

14 Claims, No Drawings

PROCESS FOR PRODUCING VINYL CHLORIDE COPOLYMER

BACKGROUND OF THE INVENTION

1. Field of the Invention

The present invention relates to a process for producing a vinyl chloride copolymer which has good moldability and can be made into polyvinyl chloride moldings having a good matte finish surface and superior in permanent compression set resistance, creep resistance, heat resistance, and electrical properties.

2. Description of the Prior Art

The thermoplastic elastomeric composition composed mainly of vinyl chloride resin has an advantage in moldability over other compositions such as rubber. That is, it can be molded by extrusion or injection. The resulting molded products, however, have low permanent compression set resistance and creep resistance and also have a surface which is not easily matte-finished.

A conventional means to overcome this disadvantage is to increase the degree of polymerization of vinyl chloride resin or to add a cross-linkable monomer to vinyl chloride at the time of polymerization, thereby increasing the apparent degree of polymerization of vinyl chloride resin. However, it has a shortcoming that the vinyl chloride resin having an increased degree of polymerization is extremely poor in moldability and needs a special processing machine and technology in order for it to exhibit the desired physical properties.

SUMMARY OF THE INVENTION

The present invention was completed to solve the above-mentioned difficulties. Accordingly, it is an object of the present invention to provide a process for producing a vinyl chloride copolymer which has good moldability and can be made into moldings having a good matte finish surface and superior in mechanical properties such as permanent compression set resistance and creep resistance, heat resistance and electrical properties.

According to the present inventor's investigation, the above-mentioned objective is achieved by copolymerizing vinyl chloride monomer or a monomer mixture composed of vinyl chloride monomer as a main component and copolymerizable monomer, with one or more than one kind of cross-linking agent selected from polyhydric alcohol diglycidyl ether diacrylate and dimethacrylate represented by the formula shown below;

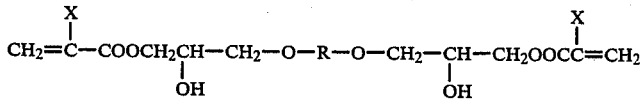

[where R is an alkylene group having 2 to 8 carbon atoms or a group represented by the following formula,

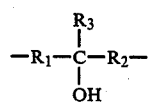

(where $R_1$ and $R_2$ each denote an alkylene group having 1 to 6 carbon atoms, and $R_3$ denotes a hydrogen atom or alkyl group having 1 to 6 carbon atoms), and X denotes a hydrogen atom or methyl group].

The copolymer produced as mentioned above has good moldability and can be readily formed into moldings by ordinary extrusion or injection. The resulting moldings have a good matte finish surface and are superior in mechanical properties such as permanent compression set resistance and creep resistance, heat resistance and electrical properties. It is suitable for use as wire covering, automotive parts, packings, hoses and the like.

DETAILED DESCRIPTION OF THE INVENTION

According to the process of the present invention, the production of the vinyl chloride copolymer starts with vinyl chloride monomer or a monomer mixture composed of vinyl chloride and copolymerizable monomer.

The monomer mixture should preferably contain more than 50% by weight of vinyl chloride. The comonomer copolymerizable with vinyl chloride includes, for example, vinyl acetate and vinyl propionate, acrylic ester or methacrylic ester such as methyl acrylate and ethyl acrylate; olefins such as ethylene and propylene; and maleic anhydride, acrylonitrile, styrene, and vinylidene chloride. These comonomers are used alone or in combination with one another.

According to the present invention, the above-mentioned starting material is copolymerized with one or more than one kind of cross-linking agent selected from polyhydric alcohol diglycidyl ether diacrylate and dimethacrylate represented by the formula (1) below;

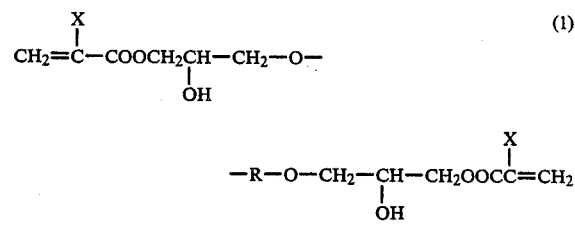

[where R is an alkylene group having 2 to 8 carbon atoms or a group represented by the formula below;

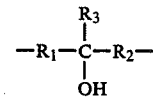

(where $R_1$ and $R_2$ each denote an alkylene group having 1 to 6 carbon atoms, and $R_3$ denotes a hydrogen atom or alkyl group having 1 to 6 carbon atoms), and X denotes a hydrogen atom or methyl group].

The polyhydric alcohol diglycidyl ether diacrylate or dimethacrylate is produced by reacting a polyhydric alcohol with epichlorohydrin to give a polyhydric alcohol glycidyl ether and subsequently reacting it with acrylic acid or methacrylic acid. Preferred examples of the polhydric alcohol include dihydric alcohols such as ethylene glycol, propylene glycol, butanediol, pentanediol, and hexanediol, and trihydric alcohols such as glycerin, butanetriol, pentanetriol, hexanetriol, and pentamethylglycerin. Most preferable among them is glycerin. The most preferred example of the cross-linking agent represented by the formula (1) above is glycerin diglycidyl either diacrylate or glycerin diglycidyl ether dimethacrylate.

The polyhydric alcohol diglycidyl ether diacrylate or dimethacrylate used as the cross-linking agent should previously be treated with water for the extraction of impurities such as catalyst used and by-product formed during its production. The extraction of impurities with water renders the resulting vinyl chloride copolymer superior in electrical properties such as volume resistivity. The process for extraction is not specifically limited so long as it is effective for the removal of impurities. For example, it can be carried out by stirring the polyhydric alcohol diglycidyl ether diacrylate or dimethacrylate together with 10 to 20% by weight of pure water at room temperature to about 80° C., preferably 30 to 60° C. at which the compound does not hydrolyze, for about 5 to 120 minutes, followed by standing for about 10 minutes to 5 hours until layer separation and discarding the water layer.

The above-mentioned cross-linking agent (1) may be added to the reaction system containing the vinyl chloride starting material at any time: before the polymerization is initiated or after the polymerization has proceeded to a certain extent. The timing of addition should be properly selected according to the reaction system employed and the process of reaction.

The amount of the cross-linking agent is not specifically limited but may be established according to the kind and use of the desired vinyl chloride copolymer. Usually, it is about 0.1 to 10% by weight, preferably 0.3 to 5% by weight, based on the amount of starting material. Selection should be made such that the resulting vinyl chloride copolymer contains 1 to 50% by weight, preferably 5 to 30% by weight, of tetrahydrofran (THF) insolubles. With THF insolubles less than 1%, the vinyl chloride copolymer is not sufficiently improved in matte finish surface, creep resistance, and heat resistance. With THF insolubles in excess of 50%, the improvement of these characteristic properties level off and the processability may become rather poor.

The vinyl chloride copolymer of the present invention can be produced by the ordinary polymerization process. The common process is suspension polymerization which is carried out in an aqueous medium in the presence of an oil-soluble radical initiator and a dispersing agent.

The radical initiator may be selected from conventional ones for suspension polymerization. They include percarbonate compounds such as diisopropyl peroxydicarbonate, di-2-ethylhexyl peroxydicarbonate, and die-thoxyethylperoxydicarbonate; perester compounds such as t-butyl peroxyneodecanate, α-cumyl peroxyneodecanate, and 2,4,4-trimethylpentyl peroxy-2-neodecanate; peroxides such as acetylcyclohexyl sulfonylperoxide and 2,4,4-trimethylpentyl-2-peroxyphenoxyacetate; and azo compounds such as azobis-2,4-dimethylvaleronitrile and azobis(4-methoxy-2,4-dimethylvaleronitrile). They are used alone or in combination with one another. The amount of the radical initiator may be 0.01 to 1% preferably 0.01 to 0.5% by weight of the amount of starting material.

The dispersing agent includes water-soluble cellulose ether such as methyl cellulose, hydroxyethyl cellulose, hydroxypropyl cellulose, and hydroxypropylmethyl cellulose, partially saponified polyvinyl alcohol, acrylic acid polymer, and gelatin; oil-soluble emulsifiers such as sorbitan monolaurate, sorbitan trioleate, glycerin tristearate, and ethylene oxide-propylene oxide block copolymer; and water-soluble emulsifier such as polyoxyethylene sorbitan monolaurate, polyoxyethylene glycerin oleate, and sodium laurate. They are used alone or in combination with one another. The amount of the dispersing agent may be 0.01 to 1%, preferably 0.01 to 0.5% by weight based on the amount of starting material.

Additional agents that can be optically used include a polymerization regulator, chain transfer agent, polymerization inhibitor, gelatin improver, antistatic agent, and pH regulator, which are commonly used for the polymerization of vinyl chloride.

The conditions for polymerization are not specifically limited; but the ordinary ones are employed. With a polymerization temperature lower than 20° C., the reaction may take a long time and the productivity may be poor. With a polymerization temperature higher than 80° C., the resulting vinyl chloride copolymer may be poor in creep resistance and heat resistance. Therefore, a preferred polymerization temperature ranges from 20° to 80° C.

The vinyl chloride copolymer obtained in the above-mentioned manner is incorporated with a plasticizer, stabilizer, slip agent, filler, and pigment, according to need, to be made into a resin composition. Being composed mainly of the above-mentioned vinyl chloride copolymer, the resulting resin composition is superior in processability and provides moldings having a good matter finish surface, compression set resistance, creep resistance, heat resistance, and electrical properties. Therefore, they found use as high-performance wire covering, automotive parts, packings, hoses the the like.

Examples of the plastizer used for the vinyl chloride copolymer include alkyl esters of aromatic polybasic acids such as dibutyl phthalate, dioctyl phthalate, and butylbenzyl phthalate; alkyl esters of aliphatic polybasic acids such as dioctyl adipate, dioctylazelate, and dioctyl sebacate; and alkyl esters of phosphoric acid such as tricresyl phosphate. They are used alone or in combination with one another. The plasticizer is used in an amount of 0 to 200 parts by weight for 100 parts by weight of vinyl chloride copolymer.

The above-mentioned resin composition can be molded by the ordinary method such as extrusion molding and injection molding under the normal molding conditions.

To further illustrate the invention, and not by way of limitation, the following examples are given.

Examples 1 and 2 and Comparative Examples 1 and 2

In a 100-liter autoclave were placed 60 liters of water, 30 g of partially saponified polyvinyl alcohol, 30 kg of vinyl chloride monomer, 24 g of di-2-ethylhexyl peroxydicarbonate, and a cross-linking agent shown in Table 1. Polymerization was started at 42° C., and the reaction was suspended when the degree of conversion reached 80%. Unreacted vinyl chloride was recovered and then the desired copolymer was collected, dehydrated, and dried.

The vinyl chloride copolymer was examined for THF insolubles according to the method given below.

The vinyl chloride copolymer was compounded into a resin composition according to the following formulation.

| Vinyl chloride copolymer | 100 parts by weight |
|---|---|
| Trimethyl trimellitate | 80 parts by weight |
| Lead tribasic stearate | 3 parts by weight |
| Lead stearate | 1 parts by weight |
| Calcium carbonate | 10 parts by weight |

The resulting resin composition was examined for processability, matte finish characteristics, permanent compression set, and volume resistivity according to the methods given below. The results are shown in Table 1.

Measurement of THF insolubles

Dissolve 1 g of the copolymer in 80 ml of THF in a 100-ml color comparison tube, and thoroughly shake the tube at normal temperature. Shake the tube in a water bath at 75° to 85° C. for 5 minutes, and cool the solution to normal temperature. Replenish THF up to the marked line of 100 ml, and vigorously shake the tube. Allow the tube to stand overnight Pipet 10 ml of the supernatant liquid. Dry up the liquid to remove THF and accurately measure the weight (W g) of the resin. Calculate THF insolubles from the following formula.

THF insolubles (%)=(1−W)×100

Processability

The resin composition was placed on a 6-inch roll having a surface temperature of 190° C., and the time required for the resin composition to wind around the roll was measured. The time was regarded as a criterion for judging the processability. The shorter the time, the better the processability.

Matte finish characteristics

The composition was roll-milled for 10 minutes, and the surface of the resulting sheet was visually inspected. The matte finish characteristics were rated in the following four grades.
A: Surface with uniform matte finish
B: Surface with slightly nonuniform matte finish
C: Surface with glossy parts
D: Glossy surface

Compression set resistance

The rolled sheet was pressed at 180° C. to prepare a test piece. The test piece was examined for permanent compression set according to JIS K6301, 25% compression, at 70° C. for 22 hours.

Volume resistivity

The test pieces prepared in the same manner as mentioned above was examined for volume resistivity according to JIS K6723.

TABLE 1

| | Example 1 | Example 2 | Comparative Example 1 | Comparative Example 2 |
|---|---|---|---|---|
| Cross-linking agent | | | | |
| Kind | Glycerin diglycidyl ether diacrylate | Ethylene glycol diglycidyl ether dimethacrylate | Diallyl phthalate | none |
| Amount, wt % on monomer | 3.5 | 3.5 | 0.25 | none |
| THF insolubles (wt %) | 20 | 20 | 28 | none |
| Roll winding time (sec) | 50 | 55 | 150 | 30 |
| Matte finish rating | A | A | B | D |
| Compression set (%) | 48 | 49 | 51 | 59 |
| Volume resistivity (Ω-cm) | $3.5 \times 10^{13}$ | $2.8 \times 10^{13}$ | $4.5 \times 10^{14}$ | $8.2 \times 10^{14}$ |

Example 3

The same procedure as in Example 1 was repeated except that a water-treated cross-linking agent was used. The water-treatment was performed by repeating three times the stirring of glycerin glycidyl ether diacrylate with 50% by weight of pure water at 50° C. for 10 minutes, followed by standing for 3 hours and removal of the supernatant liquid. The resulting vinyl chloride copolymer was evaluated. The results are shown in Table 2.

TABLE 2

| | Example 3 |
|---|---|
| THF insolubles (%) | 20 |
| Roll winding time (sec) | 50 |
| Matte finish rating | A |
| Compression set (%) | 48 |
| Volume resistivity (Ω-cm) | $40 \times 10^{14}$ |

It is noted from Tables 1 and 2 that the vinyl chloride copolymer containing polyhydric alcohol diglycidyl ether diacrylate or dimethacrylate as a cross-linking agent has satisfactory processability, matte finish characteristics, compression set, and volume resistivity. It is also noted that the vinyl chloride copolymer is further improved in volume resistivity when the polyhydric alcohol diglycidyl ether diacrylate is treated with water.

What is claimed is:
1. A process for producing a vinyl chloride copolymer which comprises
copolymerizing a suspension of vinyl chloride monomer or a monomer mixture composed of more than 50% by weight of vinyl chloride monomer and a copolymerizable monomer as the starting material in an aqueous suspension containing an oil-soluble radical initiator and a dispersing agent with from 0.1 to 10 percent by weight based on the weight of the starting material of a crosslinking agent selected from the group consisting of polyhydric alcohol diglycidyl ether diacrylates and dimethacrylates having the formula

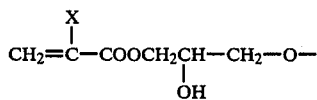

(1)

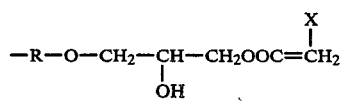

wherein

R is an alkylene group having 2 to 8 carbon atoms or a group represented by the following formula

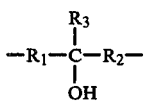

wherein $R_1$ and $R_2$ each denote an alkylene group having 1 to 6 carbon atoms and $R_3$ denotes a hydrogen atom or alkyl group having 1 to 6 carbon atoms; and X denotes a hydrogen atom or methyl group.

2. A process as claimed in claim 1, wherein the polyhydric alcohol diglycidyl ether diacrylate or dimethacrylate is glycerin diglycidyl ether diacrylate or dimethacrylate.

3. The process of claim 1 wherein the polymerization temperature is in the range from 20° C. to 80° C.

4. The process of claim 1 wherein the crosslinking agent is added to the aqueous suspension prior to initiation of the copolymerization.

5. The process of claim 1 wherein the crosslinking agent is added to the aqueous suspension after the initiation of the copolymerization.

6. The process of claim 1 wherein the diacrylate or dimethacrylate has been treated with water to extract impurities therefrom.

7. The process of claim 6 wherein the water treatment is carried out by stirring the diacrylate or dimethacrylate with 10 to 20 percent by weight of water at a temperature from ambient to about 80° C.

8. The process of claim 7 wherein the temperature is from 30° to 60° C. and the stirring is carried out for a time period from about 5 to 120 minutes, the mixture is then allowed to stand for a period from about 10 minutes to five hours until layer separation occurs and a water layer is formed and the water layer is removed.

9. The process of claim 1 wherein the amount of crosslinking agent is such that the resulting vinyl chloride copolymer contains from 1 to 50 percent by weight of THF insolubles.

10. The process of claim 1 wherein the amount of crosslinking agent is such that the resulting vinyl chloride copolymer contains from 5 to 30 percent by weight of THF insolubles.

11. The process of claim 1 wherein the initiator is present in an amount from 0.01 to 1% based on the weight of the starting material.

12. The process of claim 11 wherein the initiator is present in an amount from 0.01 to 0.5% based on the weight of the starting material.

13. The process of claim 1 wherein the amount of dispersing agent is from 0.01 to 1% by weight based on the amount of starting material.

14. The process of claim 1 wherein the amount of dispersing agent is from 0.01 to 0.5% by weight based on the amount of starting material.

* * * * *